US007105746B2

(12) United States Patent
Shimura

(10) Patent No.: US 7,105,746 B2
(45) Date of Patent: Sep. 12, 2006

(54) WIRE HARNESS AND METHOD FOR MANUFACTURING THE SAME

(75) Inventor: Kazushige Shimura, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/853,524

(22) Filed: May 26, 2004

(65) Prior Publication Data

US 2005/0006127 A1 Jan. 13, 2005

(30) Foreign Application Priority Data

May 27, 2003 (JP) .......................... P2003-149378

(51) Int. Cl.
*H01B 7/42* (2006.01)
*H02G 3/04* (2006.01)

(52) U.S. Cl. ................. 174/72 A; 174/36; 174/102 R; 174/117 F; 29/825

(58) Field of Classification Search ................. 174/36, 174/72 A, 102 R, 106 R, 117 F, 135, 137 R, 174/138 R; 29/825
See application file for complete search history.

(56) References Cited

U.S. PATENT DOCUMENTS 1,843,835 A * 2/1932 Romeiser .................... 174/103
3,404,217 A * 10/1968 Kelly ......................... 174/103
3,422,214 A * 1/1969 Kelly ......................... 174/103
4,096,346 A * 6/1978 Stine et al. ................... 174/36
4,323,721 A * 4/1982 Kincaid et al. ............... 174/36
4,406,914 A * 9/1983 Kincaid ...................... 174/107
4,737,598 A * 4/1988 O'Connor .................... 174/36
4,800,236 A * 1/1989 Lemke ........................ 174/36
5,416,268 A * 5/1995 Ellis ........................... 174/36
5,486,654 A * 1/1996 Hanak et al. ........... 174/113 R
5,541,361 A * 7/1996 Friesen et al. ................ 174/36
6,384,326 B1 * 5/2002 McFadden et al. ........... 174/36
6,476,323 B1 * 11/2002 Beebe et al. .............. 174/72 A

FOREIGN PATENT DOCUMENTS

JP 2003-100155 4/2003

* cited by examiner

*Primary Examiner*—Dean A. Reichard
*Assistant Examiner*—Adolfo Nino
(74) *Attorney, Agent, or Firm*—Finnegan, Henderson, Farabow, Garrett & Dunner, L.L.P.

(57) ABSTRACT

A wire harness includes a first electric wire for a 14V series circuit, a second electric wire for a 42V series circuit and an insulation sheet. The insulation sheet separates the first electric wire from the second electric wire and covers the first and second electric wires. A method for manufacturing the wire harness is as follows. After the first electric wire is put on a first end portion of a first surface of the insulation sheet, the insulation sheet is folded from the first end portion side so as to cover the first electric wire. Next, after the second electric wire is put on a second end portion of the first surface, the insulation sheet is folded from the second end portion side so as to cover the second electric wire and then bonded to a second surface of the insulation sheet.

8 Claims, 10 Drawing Sheets

FIG.1
PRIOR ART
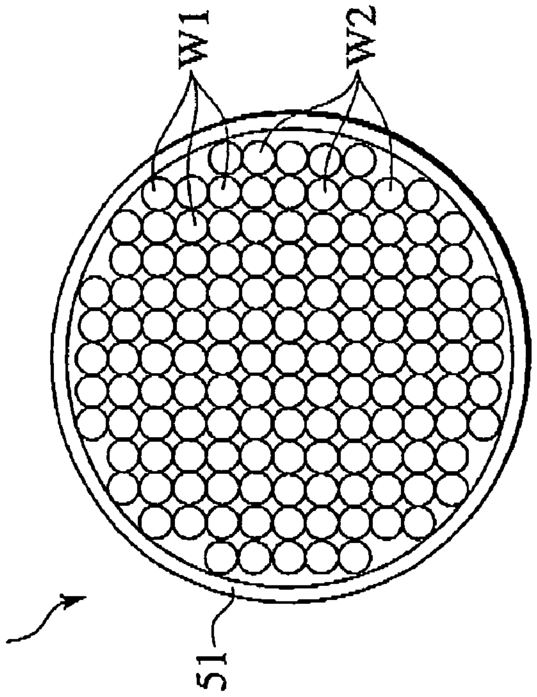
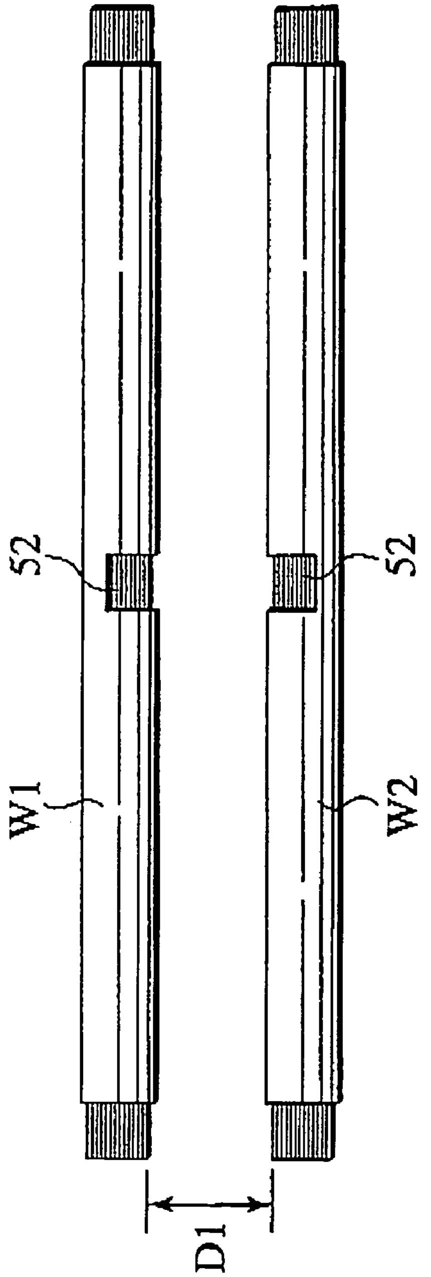
FIG.2
PRIOR ART

WIRE HARNESS AND METHOD FOR MANUFACTURING THE SAME

CROSS REFERENCE TO RELATED APPLICATION

This application claims benefit of priority under 35 U.S.C. § 119 to Japanese Patent Application No.2003-149378, filed on May 27, 2003, the entire contents of which are incorporated by reference herein

BACKGROUND OF THE INVENTION

1. Field of the Invention

The present invention relates to a wire harness including therein both electric wires for a low-voltage circuit and electric wires for a high-voltage circuit, and to a method for manufacturing the same.

2. Description of the Related Art

Recently has been developed an automobile in which loads in a 14 volts series and loads in a 42 volts series are mingled together. The automobile is mounted with a low-voltage power supply for 14V and a high-voltage power supply for 42V in the interior thereof. The high-voltage power supply is preferably connected to a motor generator, which is advantageous to fuel consumption. Therefore, it is necessary to provide two kinds of wire harnesses, namely a wire harness for electric wires used for the 42V series circuit and a wire harness for electric wires used for the 14V series circuit. However, it is difficult to lay two kinds of wire harnesses through different paths because the interior space of an automobile is limited.

In order to solve the above problem, a wire harness is disclosed in Japanese Patent Provisional Publication 2003-100155. As shown in FIG. 1, a wire harness 50 is formed by winding a constraint tape 51 around the external circumference of a bunch of electric wires including therein electric wires W1 for the 14V series circuit and electric wires W2 for the 42V series circuit.

Since the electric wires W1 and the electric wires W2 are contained together in the wire harness 50, a creepage distance D1 has a small value, wherein the creepage distance D1 corresponding to the shortest distance between the electric wires W1 and the electric wires W2. Therefore, as shown in FIG. 2, when openings 52 are formed on coating material of the electric wires W1 and the electric wires W2 due to collision of the vehicle, a leak current and/or an arc current will be generated within the wire harness 50. Further, as shown in FIG. 3, a leak current and/or an arc current will be generated at exposed portions 54 where the coating material is peeled off in order to connect branch electric wires 53 to the electric wires W1 and the electric wires W2. The electric wires W1 are also influenced by electromagnetic noise generated in the electric wires W2.

SUMMARY OF THE INVENTION

The object of the present invention is to provide a wire harness including therein electric wires for a low-voltage circuit and electric wires for a high-voltage circuit and preventing generation of a leak current and/or an arc current surely, and to provide a method for manufacturing the same.

Further, the object of the present invention is to provide a wire harness including therein electric wires for a low-voltage circuit and electric wires for a high-voltage circuit and preventing the electric wires for a low-voltage circuit from being influenced by electromagnetic noise generated in the electric wires for a high-voltage circuit, and to provide a method for manufacturing the same.

In order to achieve the above objects, the present invention provides a wire harness comprising: a first electric wire to be used for a low-voltage circuit; a second electric wire to be used for a high-voltage circuit; and an insulation sheet separating the first electric wire from the second electric wire and covering the external circumference of the first electric wire and the external circumference of the second electric wire.

According to the present invention, since the first electric wire and the second electric wire are separated from each other and enveloped with the insulation sheet, a creepage distance between the first electric wire and the second electric wire becomes larger than a conventional creepage distance. Therefore, generation of a leak current and/or an arc current can be surely prevented.

In a preferred embodiment of the present invention, both the first electric wire and the second electric wire are composed of a plurality of wires.

According to the embodiment, the wire harness can contain a plurality of wires in the interior thereof.

In a preferred embodiment of the present invention, the wire harness further comprises a first constraint tape bundling the first electric wire and a second constraint tape bundling the second electric wire.

According to the embodiment, since the first and second electric wires is bundled with the first and second constraint tapes respectively, the creepage distance between the first electric wire and the second electric wire becomes larger than a conventional creepage distance. Moreover, it can be prevented that the first electric wire and the second electric wire are mingled together in the interior of the wire harness.

In a preferred embodiment of the present invention, the wire harness further comprises bonding members disposed on both end portions of the insulation sheet respectively.

According to the embodiment, the wire harness can surely contain the first electric wire and the second electric wire in the interior thereof.

In a preferred embodiment of the present invention, each bonding member is of double-faced adhesive tape.

According to the embodiment, the wire harness can surely contain the first electric wire and the second electric wire in the interior thereof.

In a preferred embodiment of the present invention, the wire harness further comprises a shielding sheet to be stacked on the insulation sheet, wherein the shielding sheet covering at least one of the external circumference of the first electric wire and the external circumference of the second electric wire.

According to the embodiment, transmission of electromagnetic noise will be shielded with the shielding sheet, even when any electromagnetic noise is generated from the second electric wire.

In a preferred embodiment of the present invention, the external circumference of the second electric wire is sequentially covered with the insulation sheet and the shielding sheet.

According to the embodiment, short circuit between the second electric wire and the shielding sheet can be surely prevented by the insulation sheet located between the second electric wire and the shielding sheet when the coating material of the second electric wire is scarred due to collision of the vehicle, etc.

In a preferred embodiment of the present invention, the shielding sheet is grounded by means of a ground wire.

According to the embodiment, when a short circuit occurs between the first electric wire (or the second electric wire) and the shielding sheet, electric shock can be surely prevented because the shielding sheet has been grounded by means of the ground wire.

In order to achieve the above objects, the present invention provides a method for manufacturing a wire harness comprising the steps of disposing a first bonding member and a second bonding member on a first end portion and a second end portion of a first surface of an insulation sheet respectively; putting a first electric wire on the first end potion side of the first surface; folding the insulation sheet from the first end portion side so as to cover the external circumference of the first electric wire; bonding the folded first end portion to the first surface of the insulation sheet with the first bonding member; putting a second electric wire on the second end potion side of the first surface; folding the insulation sheet from the second end portion side so as to cover the external circumference of the second electric wire; and bonding the folded second end portion to the second surface of the insulation sheet, which has covered the first electric wire, with the second bonding member.

According to the present invention, since the first electric wire and the second electric wire are separated from each other and enveloped with the insulation sheet, the creepage distance between the first electric wire and the second electric wire becomes larger than a conventional creepage distance. Therefore, generation of a leak current and/or an arc current can be surely prevented.

In a preferred embodiment of the present invention, the first electric wire is composed of a plurality of wires and the wires are bundled with a constraint tape.

According to the embodiment, since the first electric wire is bundled with the constraint tape, the creepage distance between the first electric wire and the second electric wire becomes larger than a conventional creepage distance.

In a preferred embodiment of the present invention, the second electric wire is composed of a plurality of wires and the wires are bundled with a constraint tape.

According to the embodiment, since the second electric wire is bundled with the constraint tape, the creepage distance between the first electric wire and the second electric wire becomes larger than a conventional creepage distance.

In a preferred embodiment of the present invention, the first electric wire is used for a low-voltage circuit and the second electric wire is used for a high-voltage circuit.

According to the embodiment, generation of a leak current and/or an arc current can be surely prevented.

In order to achieve the above objects, the present invention provides a method for manufacturing a wire harness comprising the steps of putting a sheet of aluminum foil on an insulation sheet; disposing a first bonding member and a second bonding member on a second end portion of a first surface and on a first end portion of a second surface of the insulation sheet respectively; putting a first electric wire on the sheet of aluminum foil; folding both the insulation sheet and the sheet of aluminum foil from the first end portion side so as to cover the external circumference of the first electric wire; bonding the first surface of the folded first end portion to the second end portion with the first bonding member; putting a second electric wire on the first end potion side, which has bonded to the second end portion, of the second surface of the insulation sheet; folding both the insulation sheet and the sheet of aluminum foil from the first end portion side, which has bonded to the second end portion, so as to cover the external circumference of the second electric wire; and bonding the folded first end portion to the second surface of the insulation sheet, which has covered the first electric wire, with the second bonding member.

According to the present invention, since the first electric wire and the second electric wire are separated from each other and enveloped with both the insulation sheet and the sheet of aluminum foil, the creepage distance between the first electric wire and the second electric wire becomes larger than a conventional creepage distance. Therefore, generation of a leak current and/or an arc current can be surely prevented. Further, transmission of electromagnetic noise will be shielded with the shielding sheet, even when any electromagnetic noise is generated from the second electric wire.

In a preferred embodiment of the present invention, the first electric wire is composed of a plurality of wires and the wires are bundled with a constraint tape.

According to the embodiment, since the first electric wire is bundled with the constraint tape, the creepage distance between the first electric wire and the second electric wire becomes larger than a conventional creepage distance.

In a preferred embodiment of the present invention, the second electric wire is composed of a plurality of wires and the wires are bundled with a constraint tape.

According to the embodiment, since the second electric wire is bundled together with the constraint tape, the creepage distance between the first electric wire and the second electric wire becomes larger than a conventional creepage distance.

In a preferred embodiment of the present invention, the first electric wire is used for a low-voltage circuit and the second electric wire is used for a high-voltage circuit According to the embodiment, generation of a leak current and/or an arc current and transmission of electromagnetic noise can be surely prevented.

BRIEF DESCRIPTION OF THE DRAWINGS

FIG. 1 is a cross section view of a conventional wire harness.

FIG. 2 is an explanatory view of a creepage distance between an electric wire for a 14V series circuit and an electric wire for a 42V series circuit as to the conventional wire harness.

DESCRIPTION OF THE PREFERRED EMBODIMENT

First Embodiment

Figure 3:
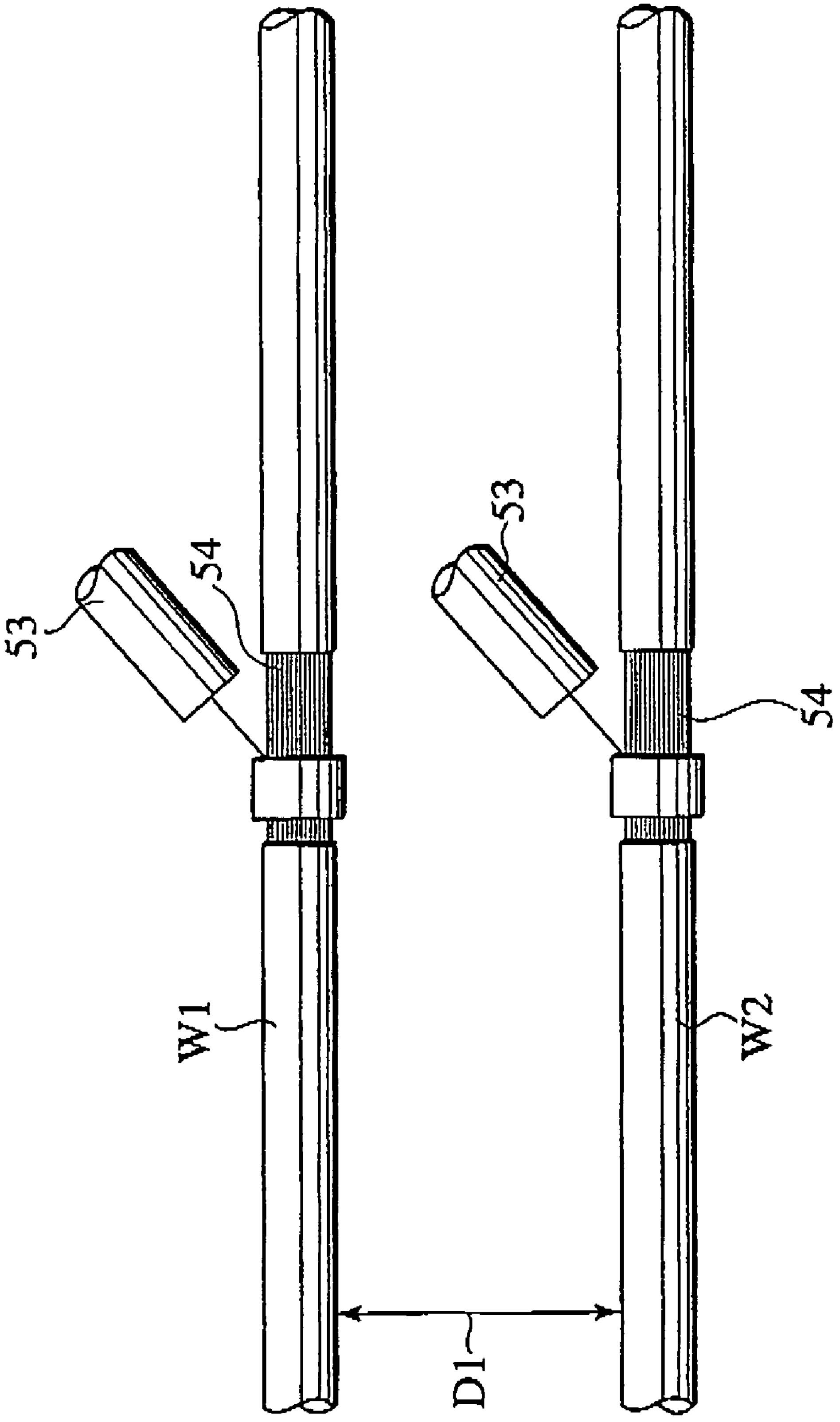
FIG.3 PRIOR ART
FIG. 3 is an explanatory view of a creepage distance between an electric wire for a 14V series circuit and an electric wire for a 42V series circuit as to the conventional wire harness in the case where a branch electric wire is connected to each electric wire.
Figure 4:
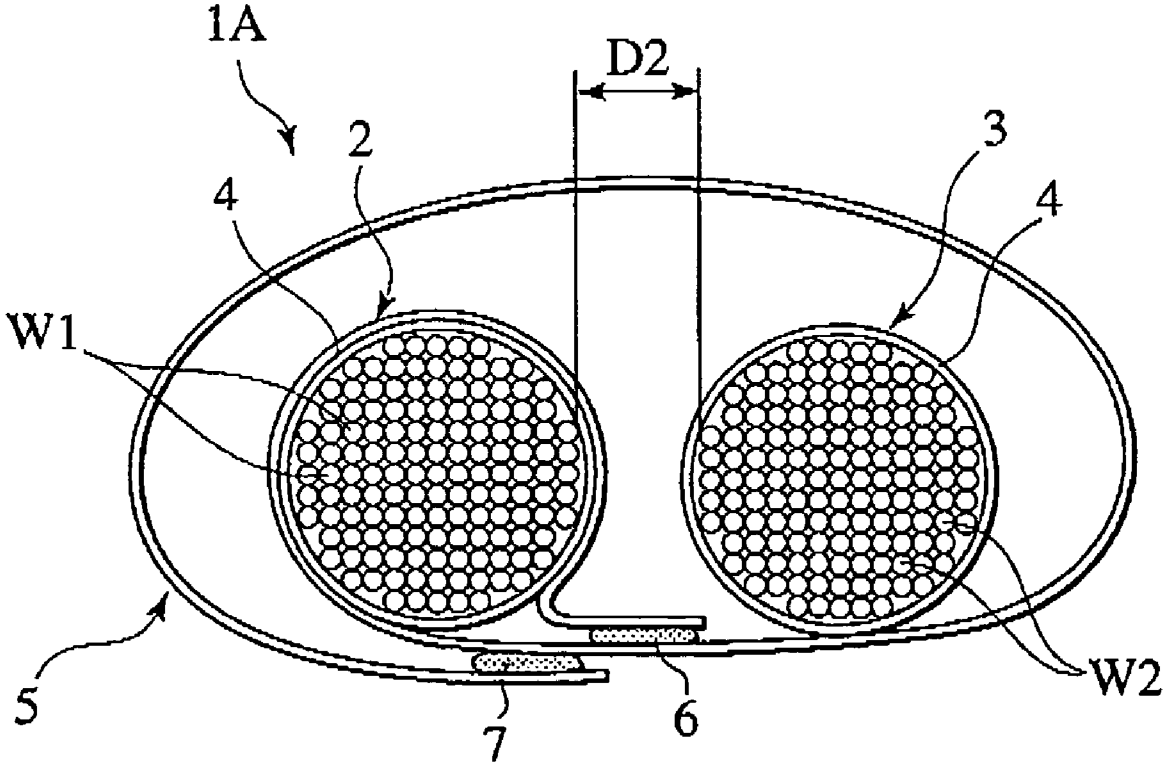
FIG. 4 is a cross section view of a wire harness according to a first embodiment of the present invention.

As shown in FIG. 4, a wire harness 1A includes bunches of electric wires 2, 3, an insulation sheet 5, and double-faced adhesive tapes 6, 7. An electric wire (a first electric wire) W1 is one for a 14V series circuit (a low-voltage circuit). An electric wire (a second electric wire) W2 is one for a 42V series circuit (a high-voltage circuit). The bunch of electric wires 2 has the electric wires W1 and a constraint tape 4, and is formed by winding the constraint tape 4 around the external circumference of the bundled electric wires W1. The bunch of electric wires 3 has the electric wires W2 and a constraint tape 4, and is formed by winding the constraint tape 4 around the external circumference of the bundled electric wires W2. The insulation sheet 5 is made of insulator such as polyvinyl chloride. The insulation sheet 5 separates the bunch of electric wires 2 from the bunch of electric wires 3 and also covers the external circumference of the bunch of electric wires 2 and the external circumference of the bunch of electric wires 3. A creepage distance D2 corresponds to the shortest distance between the electric wires W1 and the electric wires W2.

In the following, a method for manufacturing the wire harness 1A will be described.

First, the bunch of electric wires 2 is formed by winding the constraint tape 4 around the external circumference of the bundled electric wires W1. Also, the bunch of electric wires 3 is formed by winding the constraint tape 4 around the external circumference of the bundled electric wires W2.

Figure 5:
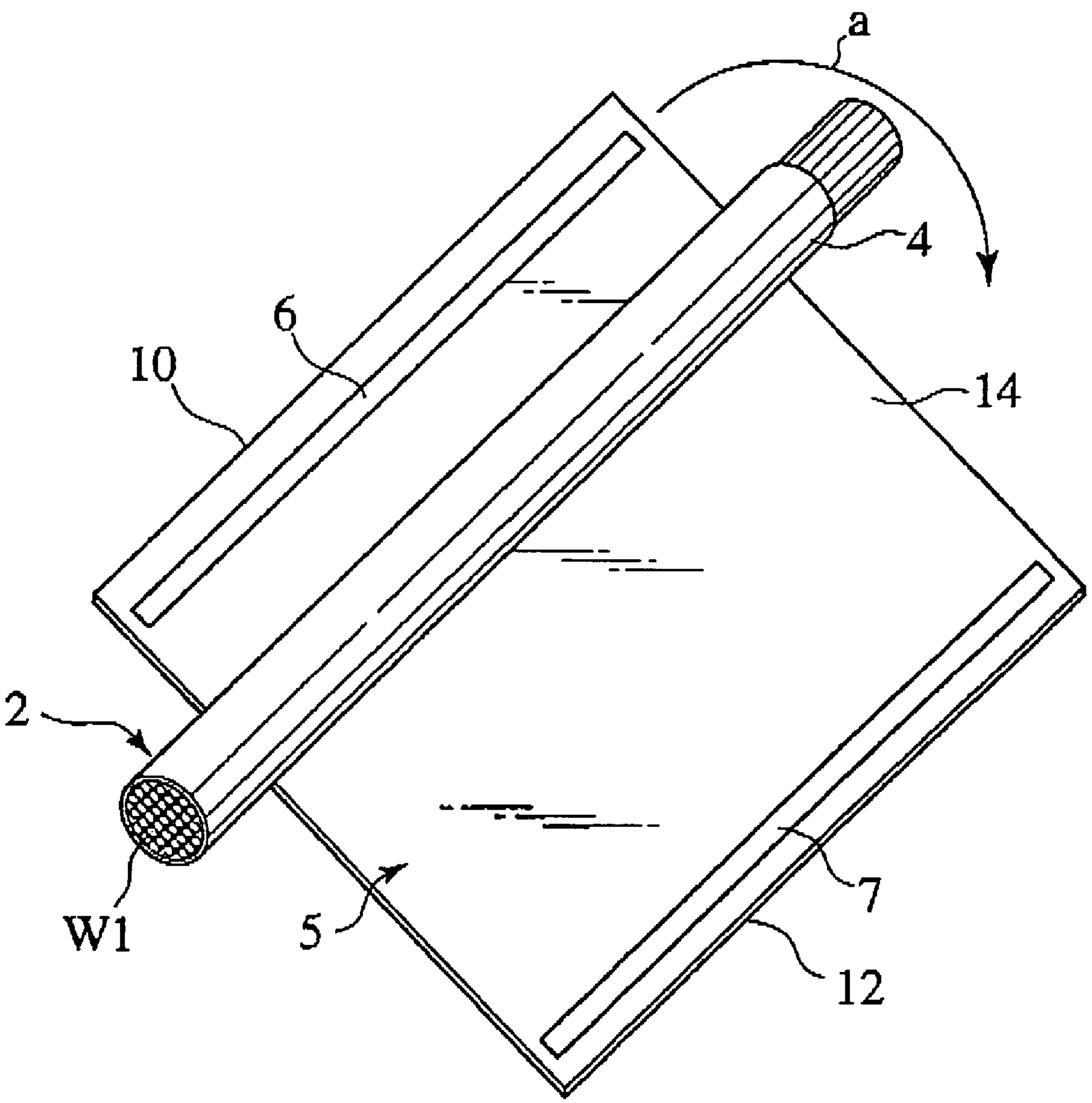
FIG. 5 is an explanatory view of the state that an insulation sheet is being wound around a bunch of electric wires for a 14V series circuit as to the wire harness according to the first embodiment of the present invention.

Second, as shown in FIG. 5, double-faced adhesive tapes 6, 7 are respectively bonded onto a first end portion 10 and onto a second end portion 12 of a first surface 14 of the insulation sheet 5. Then, after putting the bunch of electric wires 2 on the first end portion 10 side of the first surface 14, the insulation sheet 5 is folded from the first end portion 10 side in the direction of the arrow a so as to closely contact on the external circumference of the bunch of electric wires 2. The folded first end portion 10 is adhered onto the approximately central portion of the first surface 14 with the double-faced adhesive tape 6.

Figure 6:
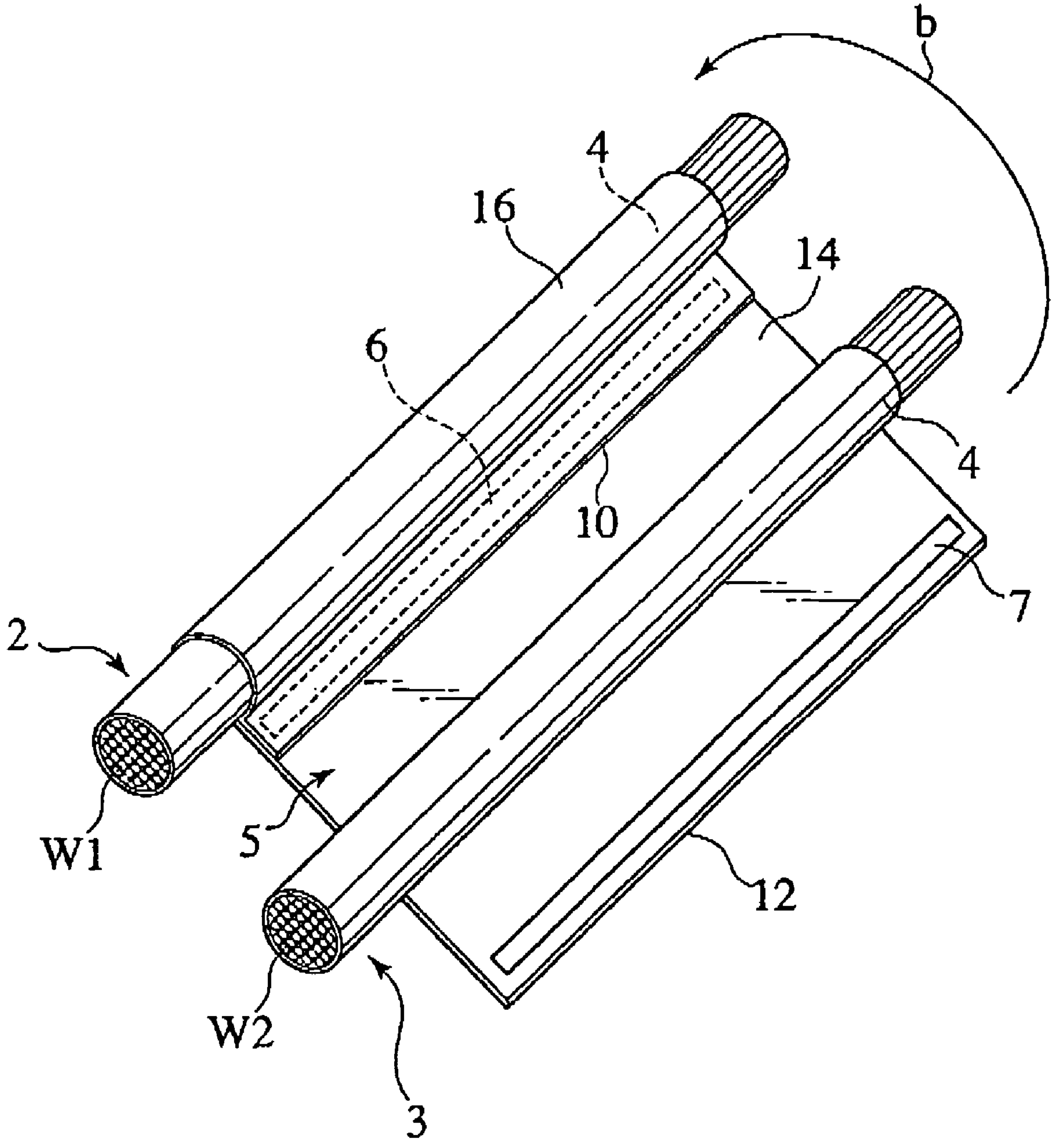
FIG. 6 is an explanatory view of the state that an insulation sheet is being wound around a bunch of electric wires for a 42V series circuit as to the wire harness according to the first embodiment of the present invention.
Figure 7:
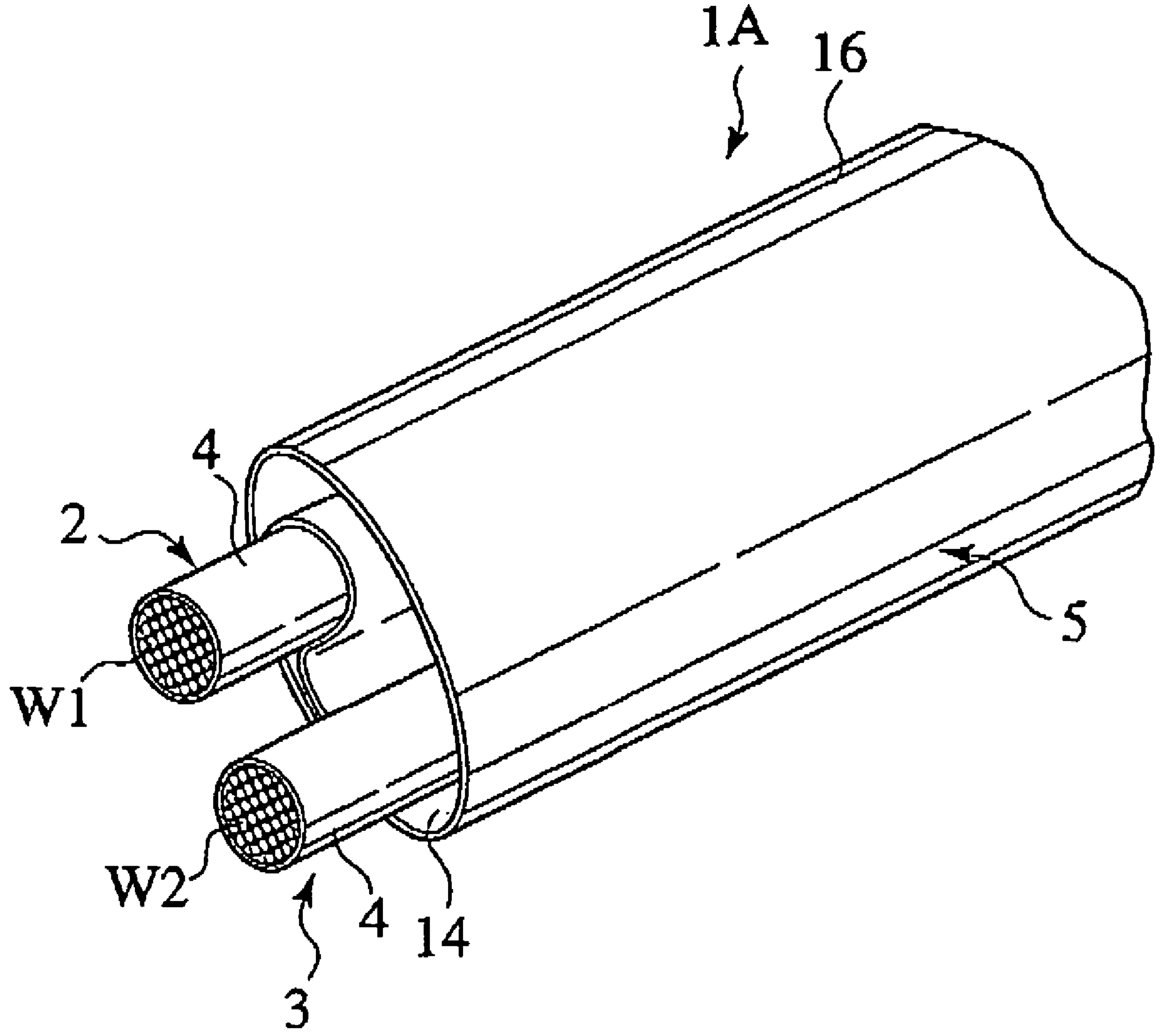
FIG. 7 is a perspective view of the wire harness according to the first embodiment of the present invention.

Next, as shown in FIG. 6, after putting the bunch of electric wires 3 on the second end portion 12 side of the first surface 14, the insulation sheet 5 is folded from the second end portion 12 side in the direction of the arrow b so as to cover the external circumference of the bunch of electric wires 3. The folded second end portion 12 is adhered onto a second surface 16 of the insulation sheet 5, which has covered the external circumference of the bunch of electric wires 2, with the double-faced adhesive tape 7. As shown in FIG. 7, the wire harness 1A is formed through the above operations, wherein the bunch of electric wires 2 and the bunch of electric wires 3 are separated from each other and the bunch of electric wires 2 and the bunch of electric wires 3 are also enveloped by the insulation sheet 5. Additionally, another constraint tape (not shown) may be wound around the external circumference of the wire harness 1A.

As to the wire harness 1A, since the electric wires W1, W2 are bundled with the constraint tapes 4, 4 respectively and the insulation sheet 5 intervenes between the bunch of electric wires 2 and the bunch of electric wires 3 having the electric wires W1, W2 respectively, the creepage distance D2 has a larger value than that of a conventional creepage distance D1. Therefore, generation of a leak current and/or an arc current is surely prevented.

As to the wire harness 1A, since the bunch of electric wires 2 and the bunch of electric wires 3 are separated from each other and also enveloped only by folding twice the insulation sheet 5, reduction in the manufacturing cost and simplification of the production operations can be realized.

Second Embodiment

Figure 8:
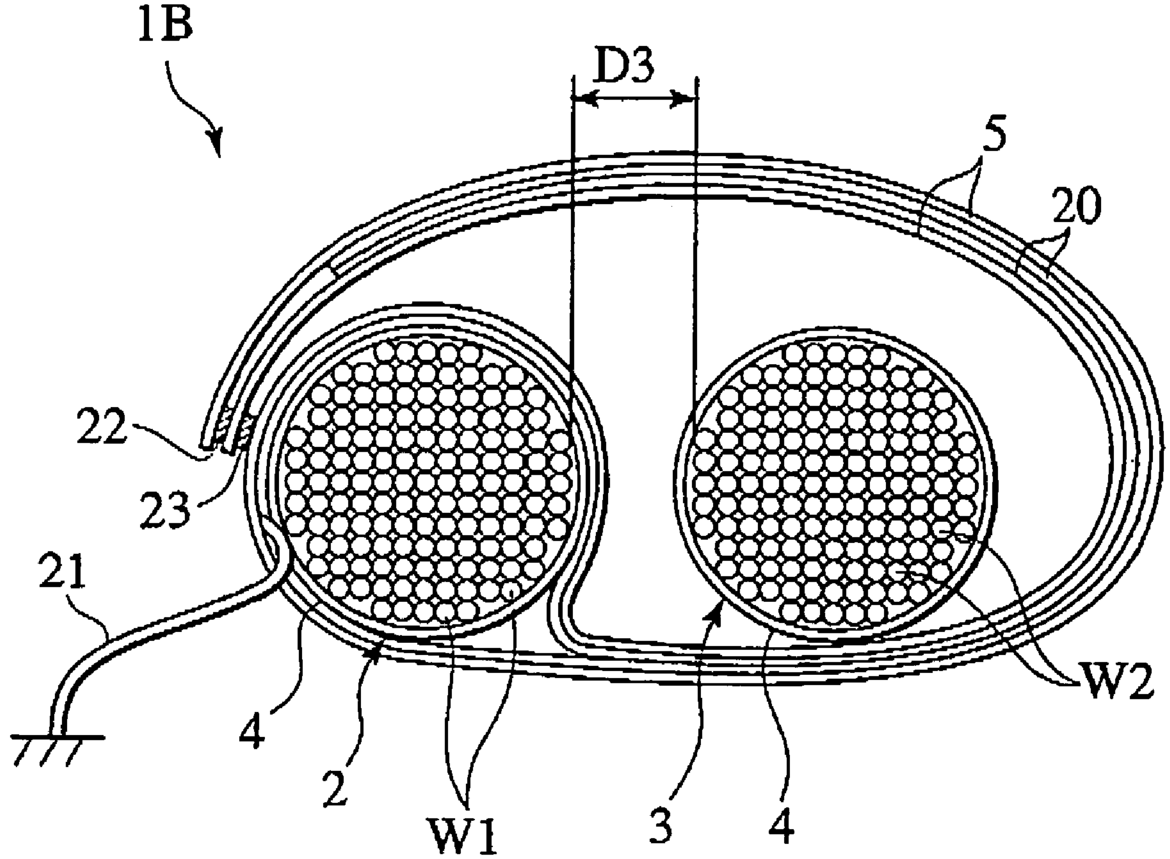
FIG. 8 is a cross section view of a wire harness according to a second embodiment of the present invention.

As shown in FIG. 8, a wire harness 1B includes bunches of electric wires 2, 3, an insulation sheet 5, a sheet of aluminum foil 20, a ground wire 21, and double-faced adhesive tapes 22, 23. An electric wire (a first electric wire) W1 is one for a 14V series circuit (a low-voltage circuit). An electric wire (a second electric wire) W2 is one for a 42V series circuit (a high-voltage circuit). The bunch of electric wires 2 has the electric wires W1 and a constraint tape 4, and is formed by winding the constraint tape 4 around the external circumference of the bundled electric wires W1. The bunch of electric wires 3 has the electric wires W2 and a constraint tape 4, and is formed by winding the constraint tape 4 around the external circumference of the bundled electric wires W2. The insulation sheet 5 is made of insulator such as polyvinyl chloride. The sheet of aluminum foil 20 functions as a shielding sheet. The insulation sheet 5 and the sheet of aluminum foil 20 separate the bunch of electric wires 2 from the bunch of electric wires 3 and also cover the external circumference of the bunch of electric wires 2 and the external circumference of the bunch of electric wires 3 The ground wire 21 is connected to the sheet of aluminum foil 20. A creepage distance D3 corresponds to the shortest distance between the electric wires W1 and the electric wires W2.

In the following, a method of manufacturing the wire harness 1B will be described.

First, the bunch of electric wires 2 is formed by winding the constraint tape 4 around the external circumference of the bundled electric wires W1. Also, the bunch of electric wires 3 is formed by winding the constraint tape 4 around the external circumference of the bundled electric wires W2.

Figure 9:
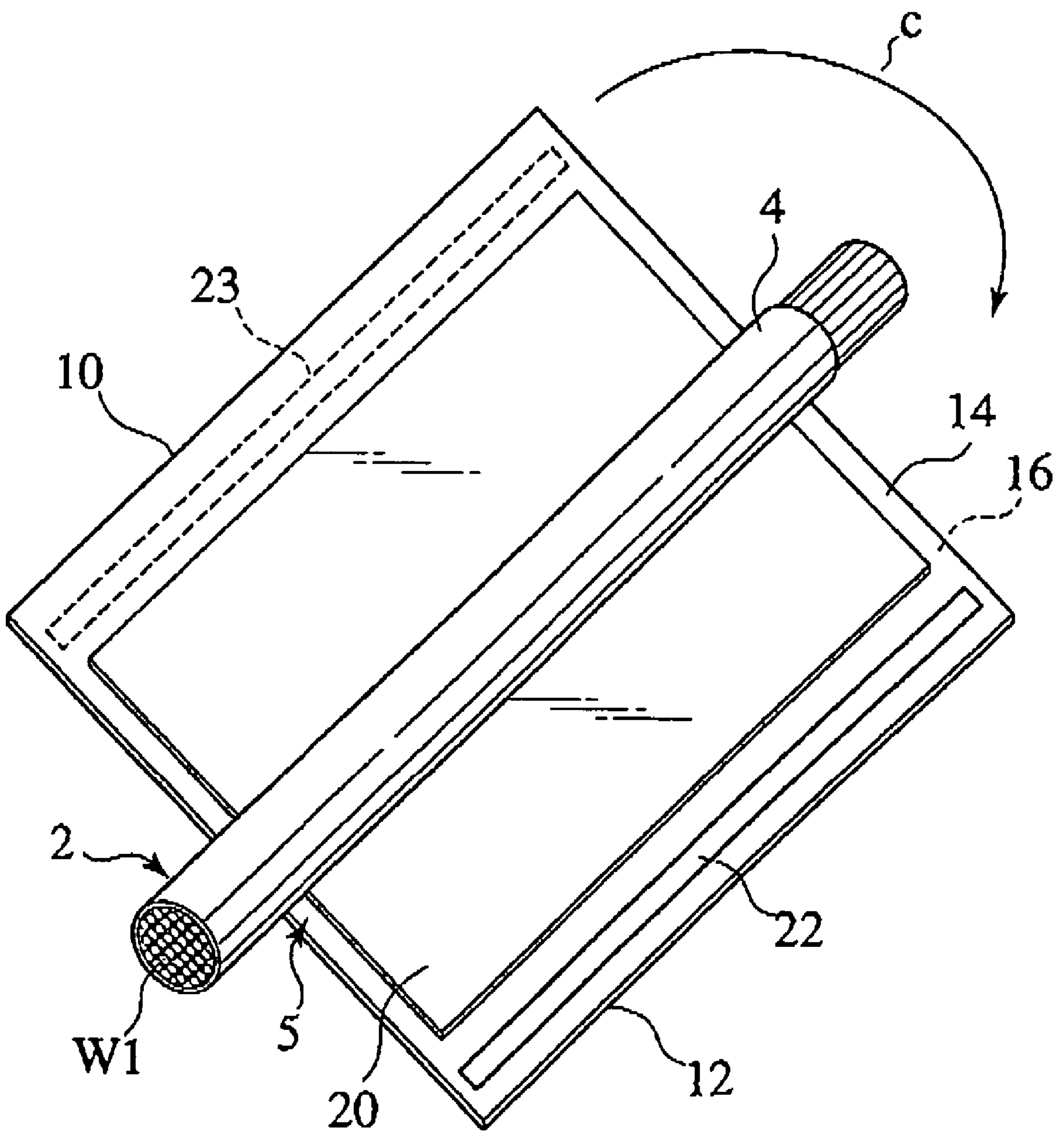
FIG. 9 is an explanatory view of the state that an insulation sheet is being wound around a bunch of electric wires for a 14V series circuit as to the wire harness according to the second embodiment of the present invention.

Second, as shown in FIG. 9, the sheet of aluminum foil 20 is put on the central portion of a first surface 14 of the insulation sheet 5. The double-faced adhesive tape 22 is bonded onto a second end portion 12 of the first surface 14. The double-faced adhesive tape 23 is bonded onto a first end portion 10 of a second surface 16 of the insulation sheet 5. Then, after putting the bunch of electric wires 2 on the central portion of the sheet of aluminum foil 20, the insulation sheet 5 is folded from the first end portion 10 side in the direction of the arrow c so as to closely contact on the external circumference of the bunch of electric wires 2. The first surface 14 of the folded first end portion 10 is adhered onto the second end portion 12 with the double-faced adhesive tape 22.

Figure 10:
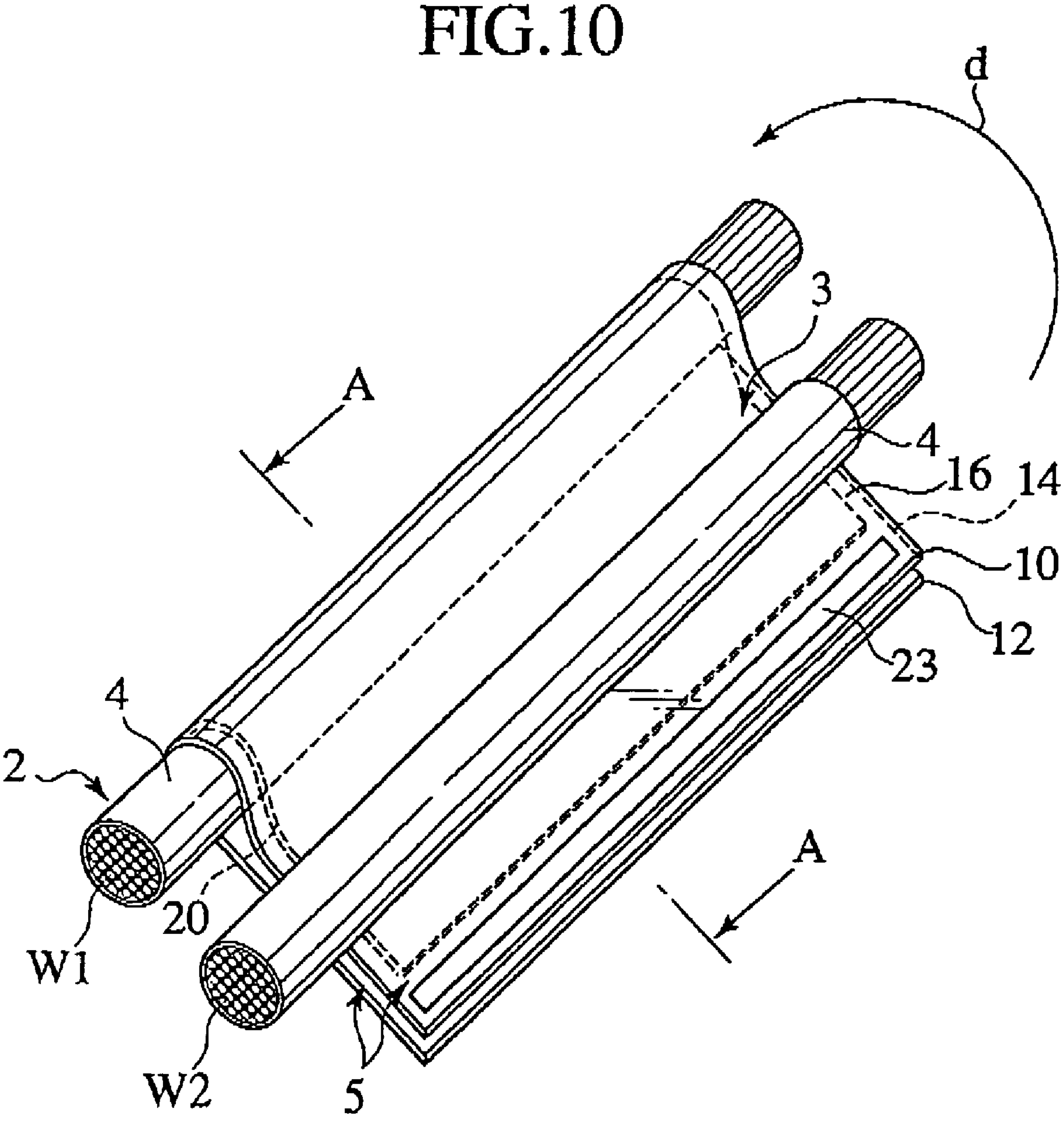
FIG. 10 is an explanatory view of the state that an insulation sheet is being wound around a bunch of electric wires for a 42V series circuit as to the wire harness according to the second embodiment of the present invention.
Figure 11:
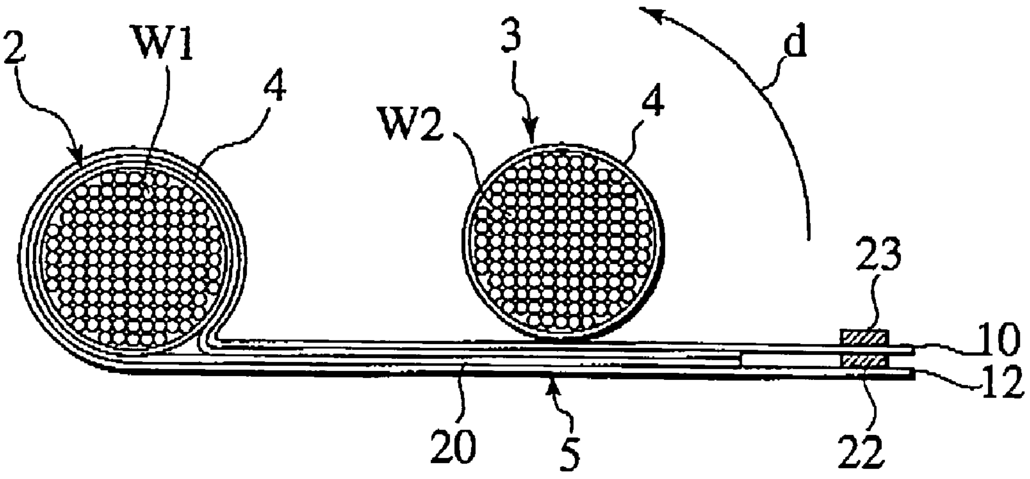
FIG. 11 is a cross section view, along the A—A line shown in FIG. 10, of the wire harness according to the second embodiment of the present invention.

Next, as shown in FIGS. 10 and 11, after putting the bunch of electric wires 3 on the first end portion 10, which has been bonded onto the second end portion 12, side of the second surface 16, both the first end portion 10 and the second end portion 12 are folded-in the direction of the arrow d so as to cover the external circumference of the bunch of electric wires 3. The folded first end portion 10 is adhered with the double-faced adhesive tape 23 onto the second surface 16 of the insulation sheet 5, which has covered the external circumference of the bunch of electric wires 2. Additionally, still another constraint tape (not shown) may be wound around the external circumference of the wire harness 1B. Finally, one end of the ground wire 21 is connected to the sheet of aluminum foil 20. The other end of the ground wire 21 is connected to a vehicle body (not shown) while laying the wire harness 1B in the vehicle.

Figure 12:
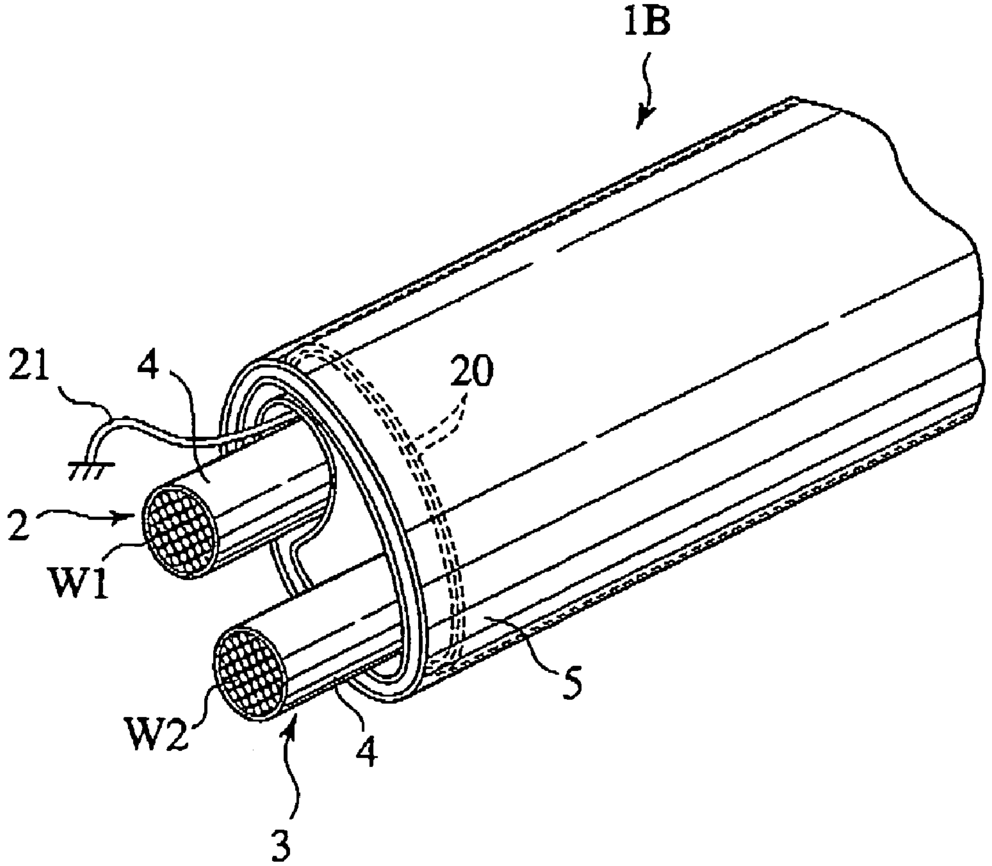
FIG. 12 is a perspective view of the wire harness according to the second embodiment of the present invention.

As shown in FIG. 12, the wire harness 1B is formed through the above operations, wherein the bunch of electric wires 2 and the bunch of electric wires 3 are separated from each other and the bunch of electric wires 2 and the bunch of electric wires 3 are also enveloped by the insulation sheet 5 and the sheet of aluminum foil 20.

As to the wire harness 1B, since the electric wires W1, W2 is bundled with the constraint tapes 4, 4 respectively, and since the insulation sheet 5 and the sheet of aluminum foil 20 intervene between the bunch of electric wires 2 and the bunch of electric wires 3 having the electric wires W1, W2 respectively, the creepage distance D3 has a larger value than that of the creepage distance D2 of the first embodiment. Therefore, generation of a leak current and/or an arc current is surely prevented.

As to the wire harness 1B, since the bunch of electric wires 2 and the bunch of electric wires 3 are separated from each other and also enveloped only by folding twice both the insulation sheet 5 and the sheet of aluminum foil 20, reduction in the manufacturing cost and simplification of the production operations can be realized.

As to the wire harness 1B, the sheet of aluminum foil 20 covers the external circumference of the bunch of electric wires 2 and the external circumference of the bunch of electric wires 3 by folding twice both the insulation sheet 5 and the sheet of aluminum foil 20 after stacking the sheet of aluminum foil 20 on the insulation sheet 5. Therefore, transmission of electromagnetic noise will be shielded with the sheet of aluminum foil 20, even when any electromagnetic noise is generated from the bunch of electric wires 3 having the electric wires W2 for a 42V series circuit. Consequently, the electric wires W1 for a 14V series circuit can be prevented from being influenced by the electromagnetic noise generated from the electric wires W2 for a 42V series circuit. Further, the wire harness 1B may be configured so that the sheet of aluminum foil 20 covers either the external circumference of the bunch of electric wires 2 or the external circumference of the bunch of electric wires 3.

As to the wire harness 1B, since the bunch of electric wire 3 is covered sequentially with the insulation sheet 5, the sheet of aluminum foil 20, and the insulation sheet 5, short circuit between the electric wire W2 and the sheet of aluminum foil 20 can be surely prevented by the insulation sheet 5 located between the electric wire W2 and the sheet of aluminum foil 20, even when the coating material of the electric wire W2 and the constraint tape 4 is scarred due to collision of the vehicle, etc.

As to the wire harness 1B, since the sheet of aluminum foil 20 is grounded by a ground wire 21, electric shock can be surely prevented, even when a short circuit occurs between the electric wire W1 (or the electric wire W2) and the sheet of aluminum foil 20. Additionally, the shielding sheet is not limited to the sheet of aluminum foil 20, but can be a sheet of any material that is capable of shielding electromagnetic noise.

Other Embodiments

Although voltages of the power supplies for a high-voltage circuit and a low-voltage circuit are 42V and 14V respectively in the first and second embodiments, the voltages are not limited to the above values but can be of various values.

The manner of folding the insulation sheet 5 shown in the first and second embodiments is merely one example, and any manner of folding, wherein the insulation sheet 5 envelops the bunch of electric wires 2 and the bunch of electric wires 3 and also separates the bunch of electric wires 2 from the bunch of electric wires 3, can be employed.

Although the electric wires W1, W2 are constrained with the constraint tapes 4, 4 respectively in the first and second embodiments, the electric wires W1, W2 can be constrained directly with the isolation sheet 5 not limited to the above embodiments.

Although the folded insulation sheet 5 is adhered with the double-faced adhesive tapes 6, 7, 22, and 23 in the first and second embodiments, not limited to the above embodiments, for example, the folded insulation sheet 5 can be adhered with an adhesive.

Although the insulation sheet 5 is closely contacted onto the external circumference of the bunch of electric wires 2 in the first and second embodiments, not limited to the above embodiments, it is not necessary for the insulation sheet to contact closely onto the external circumference of the bunch of electric wires 2 so far as no problems in the manufacturing process will occur.

Although the insulation sheet 5 first covers the bunch of electric wires 2 in the first embodiment, not limited to the above embodiments, the insulation sheet can cover the bunch of electric wires 3 first.

Although, the insulation sheet 5 and the sheet of aluminum foil 20 first covers the bunch of electric wires 2 in the second embodiment, not limited to the above embodiments, the sheets can cover the bunch of electric wires 3 first after the bunch of electric wires 3 is put on the first surface 14 of the insulation sheet 5, in the state that the sheet of aluminum foil 20 is stacked onto the second surface 16 of the insulation sheet 5.

What is claimed is:

1. A method for manufacturing a wire harness comprising the steps of:

disposing a first bonding member and a second bonding member on a first end portion and a second end portion of a first surface of an insulation sheet respectively;

putting a first electric wire on the first end portion side of the first surface;

folding the insulation sheet from the first end portion side so as to cover an external circumference of the first electric wire;

bonding the folded first end portion to the first surface of the insulation sheet with the first bonding member;

putting a second electric wire on the second end portion side of the first surface;

folding the insulation sheet from the second end portion side so as to cover an external circumference of the second electric wire; and bonding the folded second end portion of the first surface to a second surface of the insulation sheet, which has covered the first electric wire, with the second bonding member.

2. The method for manufacturing a wire harness according to claim 1, wherein the first electric wire is composed of a plurality of wires and the wires are bundled with a constraint tape.

3. The method for manufacturing a wire harness according to claim 1, wherein the second electric wire is composed of a plurality of wires and the wires are bundled with a constraint tape.

4. The method for manufacturing a wire harness according to claim 1, wherein the first electric wire is used for a low-voltage circuit and the second electric wire is used for a high-voltage circuit.

5. A method for manufacturing a wire harness comprising the steps of:

putting a sheet of aluminum foil on an insulation sheet;

disposing a first bonding member and a second bonding member on a second end portion of a first surface and on a first end portion of a second surface of the insulation sheet respectively;

putting a first electric wire on the sheet of aluminum foil;

folding both the insulation sheet and the sheet of aluminum foil from the first end portion side so as to cover an external circumference of the first electric wire;

bonding the first surface of the folded first end portion to the second end portion with the first bonding member;

putting a second electric wire on the first end portion side, which has bonded to the second end portion, of the second surface of the insulation sheet;

folding both the insulation sheet and the sheet of aluminum foil from the first end portion side, which has bonded to the second end portion, so as to cover an external circumference of the second electric wire; and bonding the folded first end portion to the second surface of the insulation sheet, which has covered the first electric wire, with the second bonding member.

6. The method for manufacturing a wire harness according to claim 5, wherein the first electric wire is composed of a plurality of wires and the wires are bundled with a constraint tape.

7. The method for manufacturing a wire harness according to claim 5, wherein the second electric wire is composed of a plurality of wires and the wires are bundled with a constraint tape.

8. The method for manufacturing a wire harness according to claim 5, wherein the first electric wire is used for a low-voltage circuit and the second electric wire is used for a high-voltage circuit.

* * * * *